Nov. 29, 1955  J. H. REID  2,725,510
CAPACITOR ERROR SENSING MEANS FOR FOLLOW-UP SYSTEM
Filed Jan. 2, 1952
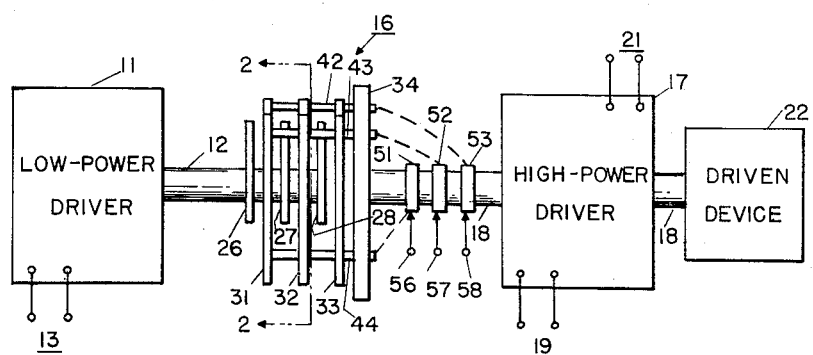
INVENTOR.
JAMES H. REID United States Patent Office 2,725,510
Patented Nov. 29, 1955

2,725,510

CAPACITOR ERROR SENSING MEANS FOR FOLLOW-UP SYSTEM

James H. Reid, Maywood, N. J., assignor to Allen B. Du Mont Laboratories, Inc., Clifton, N. J., a corporation of Delaware Application January 2, 1952, Serial No. 264,366

5 Claims. (Cl. 318—31)

The present invention relates to servomechanisms, and particularly to such mechanisms wherein a rotatable shaft having relatively high torque is caused to rotate in synchronism with another rotatable shaft having relatively low torque.

An object of the invention is to provide a servomechanism which loads a driving shaft with a minimum of torque and inertia.

Another object is to provide a balanced signal-mixing amplifier for servomechanism systems.

Other objects will be apparent from the following description taken in connection with the drawing in which Fig. 1 is an elevational view of a preferred mechanical embodiment of the invention, Fig. 2 is a sectional view taken along the line 2—2 of Fig. 1, and Fig. 3 is an electrical circuit diagram of the preferred embodiment, showing electrical connections to the devices shown in Fig. 1.

Referring to Fig. 1, a low-power driver 11 which may be, for example, a voltmeter or an ammeter or a motor, has a shaft 12 extending therefrom which is rotated thereby in accordance with electric signals applied to its terminals 13. An error-sensing device 16 is connected to the shaft 12. A high-power driver 17 which may be, for example, an electric motor, has a shaft 18 extending therefrom which is rotated thereby in accordance with electric signals applied to its A.-C. power terminals 19 and to its error-signal terminals 21. A driven device 22 which may be, for example, a dial indicator or a recorder mechanism or a gun turret or a radar antenna, is connected to be actuated by the rotatable shaft 18. The shaft 18 is also connected to the error-sensing device 16.

Now referring to Figs. 1 and 2, the error-sensing device 16 comprises rotor plates 26, 27, 28 connected to the low-power shaft 12. These rotor plates are formed from electrically conductive material in the shape of a 240-degree sector of a circular disc, and are positioned in spaced axial alignment on the shaft 12.

A stator member comprising a plurality of trisected electrically conductive plates 31, 32, 33 supported by an insulative member 34, is axially attached to and rotated by the high-power shaft 18. The high-power shaft 18 and the low-power shaft 12, are positioned in axial alignment. The trisected stator plates 31, 32, 33 are fixedly spaced along the shaft axis so as to be located between and adjacent the rotor plates 26, 27, 28 as shown in Fig. 1. Each stator plate is trisected to form three 120-degree sections 36, 37, 38, mutually insulated from one another as illustrated in Figure 2. Each set of sections is individually supported by respective pairs of metal posts 41, 42; 43, 44; and 45, 46; all posts are attached to the insulative support member 34. Slip-rings 51, 52, 53 are insulatively positioned on the high-power shaft 18. Electrical connections are made from each slip ring to a respective set of stator sections, viz., the ring 51 is connected to the post 45, the ring 52 is connected to the post 43, and the ring 53 is connected to the post 42. Sliding contact terminals 56, 57, 58 are provided for the slip rings. The low-power shaft 12 has no sliding contacts.

Now referring to Fig. 3, a source 61 of A.-C. excitation voltage is connected between the terminal 58 and ground or chassis. An amplifier 62 is provided with input terminals 63, 64 which are connected to the sliding contact terminals 56, 57. Output terminals 66, 67 are connected to the error-signal terminals 21 of the high-power driver 17. The amplifier 62 comprises a pair of input electronic tubes 68, 69 each having a grounded cathode, a control grid connected respectively to the input terminals 63, 64, and an anode connected through balanced sections of a primary 70 of a transformer 71 to a terminal of a voltage source 72, the remaining terminal of which is grounded. Condensers 73, 74 and resistors 76, 77 are connected respectively from the grids of the tubes 68, 69 to a terminal of a bias source 78, the remaining terminal of which is grounded.

Amplifier power output tubes 81, 82 have cathodes which are grounded, control grids which are connected respectively to the ends of a balanced secondary winding 83 of the transformer 71, and anodes which are connected respectively to ends of a balanced primary winding 84 of an output transformer 86. A center-tap of the secondary 83 is connected to a terminal of a bias source 87, the remaining terminal of which is grounded. A center tap of the primary 84 is connected to a terminal of a voltage source 88, the remaining terminal of which is grounded. An output winding 89 of the transformer 86 is connected to the output terminals 66, 67.

In operation of the invention, the high-power shaft 18 is caused to rotate in accordance with rotation of the low-power shaft 12. Thus, the rotor plates and stator plates of the error-sensing device 16 are always approximately in the relative positions shown in Fig. 2.

The set of stator-plate sections indicated by the numeral 36 in Figs. 2 and 3, provide a capacitive coupling between the excitation-voltage source 61 and the rotor plates 26, 27, 28. When the rotor is symmetrically positioned with respect to the stator as shown in Fig. 2, equal amplitude and equally phased excitation signals are applied to the input amplifier tubes 68, 69. This is known in the art as a "push-push" signal, due to the equal phasing. These signals are amplified by tubes 68 and 69 and applied to the balanced primary 70 of the transformer 71, where they are mutually cancelled out. Thus, no output signal is provided from the amplifier 62 to the high-power driver 21 when the rotor and stator of the error-sensing device 16 are in symmetrical alignment. This is called the "null" position.

When the rotor is rotated from the null position, the capacitive excitation-signal coupling to one of the input tubes 68 or 69 becomes relatively less, and the coupling to the other of these tubes becomes relatively greater. A temporary unbalanced signal condition then exists in the amplifier 62, and the amplified signals in the primary 70 do not entirely cancel; a resultant signal called the "error-signal," is produced in the secondary 83. This error-signal is of a type known to the art as "push-pull," and the signal is applied out-of-phase to the control grids of the output tubes 81 and 82. The push pull error signal is amplified in a well-known manner by the tubes 81, 82 and is coupled by the output transformer 86 to the error-signal terminals 21 of the high-power driver 17.

The error-signal actuates the high-power driver 17 and causes its shaft 18 to rotate in the same direction that the low-power shaft 12 has rotated. When the shaft 18 reaches the angular position of the shaft 12, the rotor and stator of the error-sensing device 16 become balanced in the null position, the error signal becomes zero value, and the high-power driver ceases to operate. Thus, when the shafts 12 and 18 tend to become rotated out of angular alignment, an error-signal is developed having proper amplitude and phase to cause the high-power driver 17 to rotate the shaft 18 into proper angular position with respect to the shaft 12.

In the preferred embodiment shown, the direction in which the high-power driver 17 rotates its shaft 18, depends upon the relative phasing of the error-signal applied to the terminals 21 and the A.-C. power applied to the terminals 19. Preferably the excitation voltage, and hence the error-signal, alternate at the same frequency as the A.-C. power signal. The phase of the error-signal depends on the direction of angular displacement between the shafts 12 and 18. A displacement in one direction will cause the input signal to the tube 68 to be relatively larger than to the tube 69, and the resultant error-signal produced in the transformer 71 will be phased in accordance with the stronger signal from the tube 68. A shaft displacement in the other direction, will reverse these relative magnitudes and phases.

Whether the low-power shaft 12 rotates continuously or intermittently, or in one direction or the other, the high-power shaft 18 will rotate accordingly without causing any appreciable torque or inertia loading on the low-power shaft 12.

While a preferred embodiment of the invention has been described in detail, modifications thereof will be apparent to those skilled in the art, which modifications will fall within the scope of invention as defined by the appended claims.

What is claimed is:

1. A servomechanism comprising a first power driven device, a second power driven device, and an error sensing device coupled between said driven devices, said second driven device being of relatively high power with respect to said first driven device, said sensing device comprising a sector-shaped rotor attached to said first driven device and a stator attached to said second driven device, said stator comprising three plates adjacent said rotor and coupled capacitively thereto, one of said plates being fixedly capacitively coupled to said rotor and the other two plates being inversely variably capacitively coupled to said rotor, said rotor overlapping said first plate and at least one of said other two plates at all positions within the range of rotation thereof.

2. A servomechanism comprising a first power driven device, a second power driven device, said second driven device being relatively high power with respect to said first driven device, an error sensing device coupled between said driven devices, said sensing device comprising a rotor mechanically coupled to said first driven device and a stator mechanically coupled to said second driven device and comprising three pickup electrodes electrically insulated from said rotor and capacitively coupled thereto, an error signal amplifier having a pair of differential input terminals, one of said differential input terminals being connected to a first one of said pickup electrodes and variably capacitively coupled thereby to said rotor, the other of said differential input terminals being connected to a second of said pickup electrodes and inversely variably capacitively coupled thereby to said rotor, and an A.-C. signal source connected to a third of said pickup electrodes, and fixedly capacitively coupled thereby to said rotor, said rotor being capacitively coupled to at least one of said first and second pickup electrodes.

3. In a servomechanism comprising a low-torque unit and a high-torque unit, an electrical signal source, and an amplifier energized by said source and connected to energize said high-torque unit, a sensing device to control the operation thereof in response to said low-torque unit, said sensing device comprising a first pickup electrode forming one plate of a first variable capacitor; a second pickup electrode forming one plate of a second variable capacitor; a rotor forming a common second plate for both said capacitors; and a third electrode adjacent to said rotor and capacitively coupled thereto, said rotor being electrically insulated from all of said electrodes and mechanically coupled to said low-torque unit; said third electrode being connected to said signal source to transfer said signal therefrom to said pickup electrodes by capactive coupling through said rotor, said pickup electrodes being mechanically coupled to said high-torque unit.

4. Position-sensing apparatus comprising a rotor assembly and a stator assembly, said rotor assembly comprising a first rotatable shaft and a sector-shaped conductive plate transversely attached thereto, and said stator assembly comprising a second rotatable shaft positioned in axial alignment with said first shaft, an insulative support member attached to said second shaft, and a trisected stator plate having three sections insulated from each other and supported insulatively by said support member, said stator plate being positioned in spaced coaxial relationship with respect to said rotor plate, one of said sections being fixedly capacitively coupled to said rotor plate, and the other two of said sections being inversely variably capacitively coupled to said rotor, said rotor plate overlapping said first section and at least one of said other two sections at all positions within the range of rotation thereof.

5. Electrical servo-apparatus comprising a position-sensing device and an electronic signal amplifier therefor, said position-sensing device comprising a rotor element and a plurality of stator elements, an A. C. signal source fixedly capacitively coupled to said rotor element by a first one of said stator elements, a pair of signal-output terminals connected respectively to two other of said stator elements symmetrically disposed with respect to said rotor element and variably capacitively coupled thereto, said amplifier comprising a balanced input circuit stage connected to said pair of signal-output terminals to derive therefrom a pair of signals the amplitudes of which vary inversely with respect to each other as said rotor element rotates with respect to said two stator elements, and means in said amplifier for deriving an error-signal from said pair of signals.

References Cited in the file of this patent

UNITED STATES PATENTS

| | | |
|---|---|---|
| Re. 23,066 | Moseley | Dec. 21, 1948 |
| 1,861,166 | Sieber | May 31, 1932 |
| 1,970,442 | Wittkuhns et al. | Aug. 14, 1934 |
| 2,244,023 | Sauer | June 3, 1941 |
| 2,480,187 | Gametsfelder | Aug. 30, 1949 |